(12) United States Patent
Dindi et al.

(10) Patent No.: US 8,815,202 B2
(45) Date of Patent: Aug. 26, 2014

(54) PROCESS FOR PRODUCING SULFURIC ACID WITH LOW LEVELS OF NITROGEN OXIDES

(71) Applicant: E I du Pont de Nemours and Company, Wilmington, DE (US)

(72) Inventors: Hasan Dindi, Wilmington, DE (US); Donald James Loftus, Lincoln University, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/969,836

(22) Filed: Aug. 19, 2013

(65) Prior Publication Data
US 2014/0056802 A1    Feb. 27, 2014

Related U.S. Application Data

(60) Provisional application No. 61/693,368, filed on Aug. 27, 2012.

(51) Int. Cl.
*C01B 17/69* (2006.01)
*C01B 17/90* (2006.01)
*C01B 17/94* (2006.01)

(52) U.S. Cl.
USPC .............................. 423/522; 423/523; 423/531

(58) Field of Classification Search
USPC ........................................... 423/522, 523, 531
See application file for complete search history.

(56) References Cited

U.S. PATENT DOCUMENTS

| | | | | |
|---|---|---|---|---|
| 2,355,702 | A | * 8/1944 | Brooks | ......................... 423/523 |
| 3,012,854 | A | 12/1961 | Plesmid | |
| 3,817,738 | A | * 6/1974 | Sprague | ........................... 71/40 |
| 5,955,050 | A | 9/1999 | Drexler | |

FOREIGN PATENT DOCUMENTS

| | | | | |
|---|---|---|---|---|
| JP | 53-144899 A | * 12/1978 | ..................... 423/523 |
| JP | 54-32196 A | * 3/1979 | ..................... 423/531 |
| RU | 2349544 C1 | 3/2009 | |

OTHER PUBLICATIONS

Aniol et al., Usuwanie Tlenkowazotu Z Kwasu Siarkowego Otrzymywanego Metoda Kontaktowa, Przemysl Chemiczny, Volu 73, No. 11, 1994, 437-438 (No Translation).
Internation Search Report, PCT/US2013/056706, Mailed Dec. 5, 2013.
Federal Specification O-S-801F, Notice 2, Jul. 27, 2011.

* cited by examiner

*Primary Examiner* — Timothy Vanoy

(57) ABSTRACT

A process for producing sulfuric acid with reduced levels of nitrogen oxides ($NO_x$) within a typical sulfuric acid production line. A hydrazine source material can be mixed with a sulfuric acid effluent at a temperature of at least about 90° C. for a period of at least 1 minute to reduce the level of $NO_x$ is the sulfuric acid effluent.

19 Claims, 2 Drawing Sheets

PROCESS FOR PRODUCING SULFURIC ACID WITH LOW LEVELS OF NITROGEN OXIDES

FIELD OF THE INVENTION

Sulfuric acid production with integral treatment of nitrogen oxide ($NO_x$) impurities, and sulfuric acid thus obtained having low levels of $NO_x$ impurities.

BACKGROUND OF THE INVENTION

Sulfuric acid, in particular concentrated sulfuric acid, typically contains small amounts of various nitrogen oxides, collectively referred to as $NO_x$. Nitrosyl sulfuric acid is believed to be the predominate $NO_x$ species, but other oxides of nitrogen may also be present. In some applications, the presence of even small amounts of nitrosyl sulfuric acid or other $NO_x$ can be problematic. For example, a specification of less than 5 parts per million (ppm) $NO_x$ for electrolyte grade sulfuric acid has been set the United States General Services Administration (Federal Specification O-S-801F, Notice 2, 27 Jul. 2011). Sulfuric acid from a typical production line including those that use spent sulfuric acid as a feed material must be post-treated to reduce the $NO_x$ below that 5 ppm level.

U.S. Pat. No. 3,012,854 discloses treatment of sulfuric acid with hydrazine sulfate or dihydrazine sulfate to eliminate oxidizing compounds and cause the acid to pass the Murray test.

U.S. Pat. No. 5,955,050 discloses a process for removal of $NO_x$ from sulfuric acid comprising treating the sulfuric acid with hydrazine, sulfamic acid or urea.

Treatments to remove $NO_x$, such as those referenced above, are done as a separate post-treatment of the sulfuric acid. It would be advantageous to have a process for $NO_x$ removal which is integral with the sulfuric acid production.

SUMMARY OF THE INVENTION

It has been found that the reaction rate of a hydrazine source selected from the group consisting of hydrazine sulfate, (di)hydrazine sulfate, and hydrazine hydrate with $NO_x$ impurities in sulfuric acid becomes fast enough at temperatures of at least about 90° C. that sulfuric acid can be treated during normal production with only minor changes to the production system.

Accordingly, the present invention pertains to a process for producing sulfuric acid with reduced levels of nitrogen oxides ($NO_x$) comprising: a) providing an absorption tower wherein sulfur trioxide is absorbed in a sulfuric acid feed having a first sulfuric acid solution to produce a sulfuric acid effluent having i) a second sulfuric acid solution which has a higher concentration than the first sulfuric acid solution, ii) a $NO_x$ concentration greater than about 5 ppm by weight (as $NO_3$) and iii) an effluent temperature of at least about 90° C.; b) admixing a hydrazine source selected from the group consisting of hydrazine sulfate, dihydrazine sulfate, and hydrazine hydrate with the sulfuric acid effluent to form a hydrazine-treated sulfuric acid effluent, the treated sulfuric acid effluent being maintained at a temperature (maintenance temperature) of at least about 90° C. for a maintenance period of at least about 1 minute.

In an aspect of the invention, the process may further comprise: c) diluting the sulfuric acid effluent with water wherein the diluting is performed before, after, or at the same time as the admixing of the hydrazine source.

In a further aspect, the process may further comprise: d) cooling the treated, diluted effluent to a temperature below about 95° C.; e) splitting the treated, diluted effluent into a first treated, diluted effluent stream and a second treated, diluted effluent stream; f) recycling the first treated, diluted effluent stream to become all or part of the sulfuric acid feed to the absorption tower; and g) collecting the second treated, diluted effluent stream as sulfuric acid product.

The hydrazine reacts with and consumes $NO_x$ thereby producing sulfuric acid product with lower $NO_x$ content than would have been produced by the same process without the addition of the hydrazine. The rate of reaction at the effluent temperature of at least about 90° C. can provide substantial $NO_x$ reduction by the time the sulfuric acid product is recovered. The effluent temperature of at least about 90° C. is routinely achieved in the normal course of sulfuric acid production. Thus, additional heating is unnecessary. However, additional heat can be provided if desired.

In another aspect, the present invention also pertains to the sulfuric acid produced by the present process, and in particular to sulfuric acid produced by the present process which has a sulfuric acid concentration of 93% to 99% and less than 5 ppm $NO_x$ (as $NO_3$), based on a weight basis of sulfuric acid.

BRIEF DESCRIPTION SUMMARY OF THE FIGURES

DETAILED DESCRIPTION OF THE INVENTION

Figure 1:
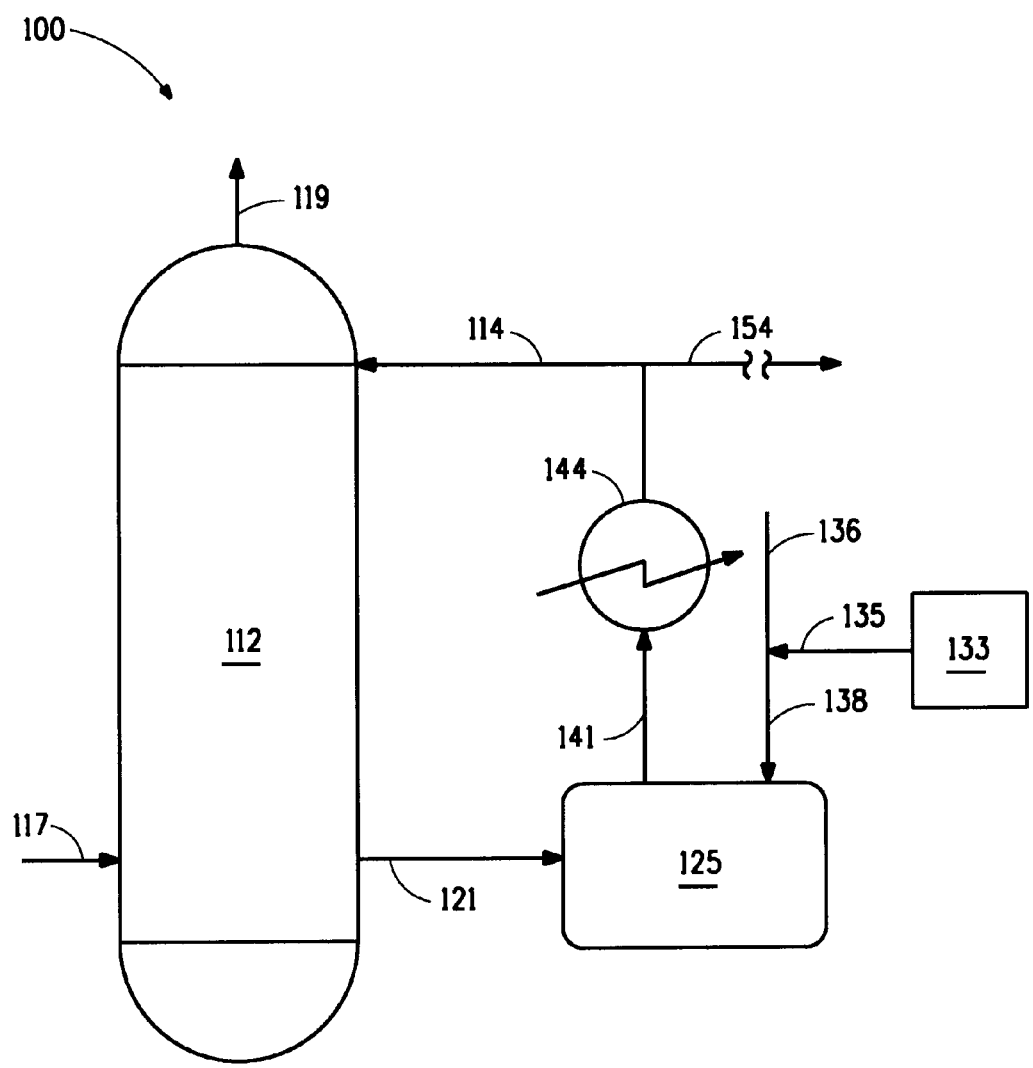
FIG. 1 illustrates an example of sulfuric acid production with integral hydrazine treatment.
Figure 2:
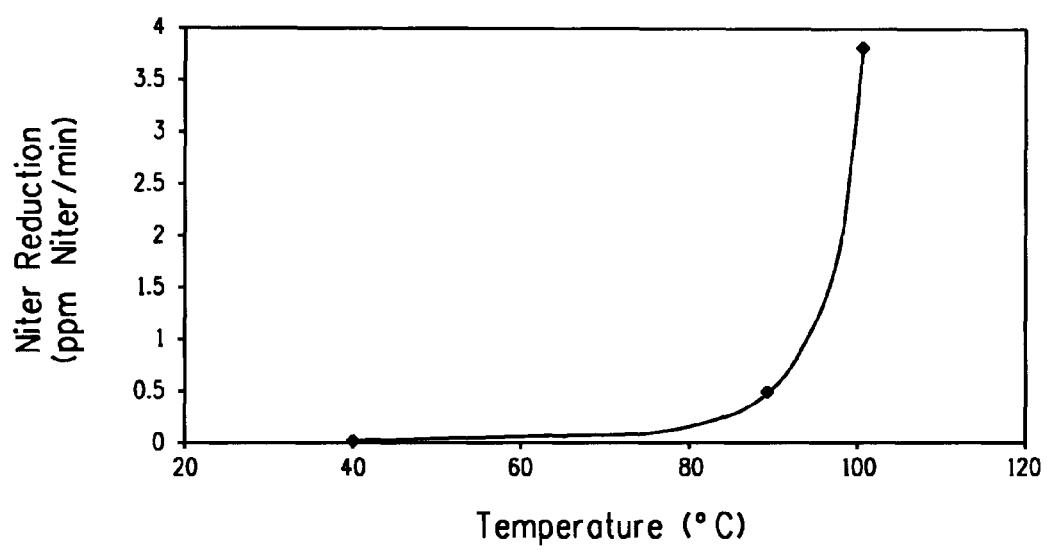
FIG. 2 illustrates the reduction of niter vs temperature.

The $NO_x$ levels in sulfuric acid are typically measured by a colorimetric test using ferrous sulfate solution. The absorbance of the $NO_x$-containing solution is compared to the absorbance of standard nitrate solutions, and the $NO_x$ concentration is reported as the ppm of $NO_x$ which provides equivalent absorbance. Because of this, in the industry, $NO_x$ is sometimes referred to as 'nitrate'. However, the $NO_x$ terminology will be used herein and it will be understood that parts per million (ppm) of $NO_3$ means nitrate-equivalent ppm by weight.

According to the process of this invention, there is provided an absorption tower wherein sulfur trioxide is absorbed in a sulfuric acid feed having a first sulfuric acid solution and sulfuric acid effluent exits the absorption tower having a second sulfuric acid solution which has a higher concentration than the first sulfuric acid solution. The absorption tower can be any suitable tower, such as those known in the art for sulfuric acid production. The absorption of $SO_3$ in the sulfuric acid feed is exothermic and the temperature of the effluent exiting the tower is typically greater than 90° C., for example, greater than 95° C., greater than 98° C., and even greater than 100° C. The concentration of the first sulfuric acid solution (first sulfuric acid concentration) can be any convenient concentration, but typically is in a concentration range of about 93% to 99% and most typically is about 98% by weight. The concentration of the sulfuric acid effluent (second sulfuric acid solution) can be any convenient concentration greater than the first sulfuric acid concentration, but is typically at least about 99% by weight.

In a typical state of the art process, the sulfuric acid effluent would typically comprise $NO_x$ levels greater than 5 ppm. Typically, the $NO_x$ levels are at least 6 ppm, at least 10 ppm, at least 20 ppm, at least 30 ppm, and can be up to 50 ppm or more.

In an aspect of the invention, the $NO_x$ level is reduced by admixing a hydrazine source selected from the group consisting of hydrazine sulfate, dihydrazine sulfate, and hydrazine hydrate with the sulfuric acid effluent to form a hydrazine-treated sulfuric acid effluent and the treated effluent is maintained at a temperature (maintenance temperature) of at least about 90° C. for a maintenance period of at least 1 minute. In a further aspect of the invention, the minimum effluent temperature can be, for example, at least about 95° C., at least about 98° C., or at least about 100° C.

The effluent is typically, but not necessarily, collected in a vessel such as, for example, a pump tank before being further processed. The collection vessel can be integral with the absorption tower, or can be separate. A portion of the sulfuric acid effluent can be taken as product and the remaining portion recycled as feed to the absorption tower. The weight ratio of product to recycle can be any suitable ratio, for example a ratio in the range of 1% to 99%, and can, if desired, be zero or 100%.

The effluent taken as recycle (recycle stream) is diluted with water to a concentration equal to the first concentration of the sulfuric acid feed to the absorption tower. The sulfuric acid effluent taken as product (product stream) can be diluted with water, if desired, or remain undiluted. The dilution with water can take place at any suitable point in the process. The level of dilution of each stream can be the same or different.

The water dilution can conveniently occur in the effluent collection vessel which can be a pump tank. Likewise, the admixing of the hydrazine can conveniently occur in this same vessel. The exothermic dilution of sulfuric acid with water also maintains or increases the temperature of the effluent and generally no external heat source is needed to maintain the temperature of at least about 90° C.

At a point downstream of the collection vessel which can be a pump tank, the temperature of the effluent decreases below about 90° C. This can be caused by heat loss to the surroundings, but is usually a deliberate cooling step such as a heat exchanger.

The time the effluent is above about 90° C. (the maintenance period) is determined by the rate (volume/minute) of sulfuric acid production and the hold-up volume of the production system between the point where the effluent is treated and the point where the effluent temperature decreases below about 90° C. For typical sulfuric acid plants, the average time between the absorption tower exit and cooling of the effluent below the minimum effluent temperature is in the range of between about 1 minute and 10 minutes. If the effluent is treated soon after exiting the tower, for example in the collection vessel which can be a pump tank, the maintenance period of the treated effluent is effectively the same range, which is to say between about 1 minute and 10 minutes. The maintenance period can be anywhere within this range above 1 minute and up to, for example 2, 3, 4, 5, 6, 7, 8 or 9 minutes.

It will be appreciated that the process of this invention is advantageously run as a continuous process and can be easily adapted to a typical sulfuric acid production process.

With regard to the rate of addition of hydrazine, preferably hydrazine can be added at a 1× to 2× stoichiometric amount relative to the amount of $NO_x$ to neutralize. One skilled in the art will readily be able to adjust the rate of hydrazine addition to achieve the amount of $NO_x$ reduction desired. As one example, to reduce sulfuric acid effluent with 30 ppm by weight $NO_x$ to a level of 5 ppm $NO_x$, about 5.2 Kg of hydrazine sulfate or about 3.3 Kg of dihydrazine sulfate can be added per 100 metric tons of sulfuric acid effluent. Of course it will be appreciated that the precise amounts depend on various factors such actual maintenance temperature, maintenance time and other conditions as may be readily determined by one of ordinary skill in the art. The hydrazine sulfate and dihydrazine sulfate, which are solids at ambient temperature, can be conveniently added as an aqueous solution.

In one embodiment, hydrazine sulfate is admixed with the sulfuric acid effluent at a rate of between 0.001 and 0.1 g of hydrazine sulfate per liter of sulfuric acid effluent. In another embodiment, hydrazine sulfate is admixed with the sulfuric acid effluent at a rate of between 1 to 1.5 moles of hydrazine sulfate per mole of NOx (as $NO_3$) in the sulfuric acid effluent.

If desired, hydrogen peroxide may be added to the treated effluent to consume any excess (di)hydrazine sulfate downstream as determined by one of ordinary skill in the art.

The sulfuric acid product produced by the process of this invention can achieve a $NO_x$ content which is substantially less than the $NO_x$ content of the same process without the addition of the hydrazine. For example, sulfuric acid treated according to the present invention can have a $NO_x$ content of 5 ppm less than that of sulfuric acid from the same process without treatment. In one embodiment of the present process, the sulfuric acid produced has a $NO_x$ content (as $NO_3$) less than 5 ppm on a weight basis of sulfuric acid whereas without addition of hydrazine the $NO_x$ would have been greater than 5 ppm on a similar basis. In a further embodiment the sulfuric acid produced has a $NO_x$ content (as $NO_3$) less than 1 ppm on a weight basis of sulfuric acid.

Turning to FIG. 1, FIG. 1 illustrates a sulfuric acid production unit 100 for one embodiment of the process of this invention. Certain detailed features of the present process, such as pumps, separation equipment, feed tanks, heat exchangers, product recovery vessels and other ancillary process equipment are not shown for the sake of simplicity and in order to demonstrate the main features of the process. Such ancillary features can be easily designed and used by one skilled in the art without any difficulty or undue experimentation.

As shown, an absorption tower 112 is fed with a sulfuric acid solution feed 114 having a first sulfuric acid concentration of about 98% and a countercurrent flow of sulfur trioxide feed 117. Sulfur dioxide, which may come in with sulfur trioxide, is vented 119 from the top of the tower. The sulfuric acid effluent from the tower 121 having a second sulfuric acid solution concentration of about 99% flows to a pump tank 125 wherein it is treated 138 with a metered amount 135 of an aqueous solution of hydrazine from storage tank 133 and diluted with make-up water 136. The treated, diluted effluent in the pump tank has a temperature of at least about 95° C. and an average residence time of about 3.5 minutes. The process flow causes the contents of the pump tank to mix. The treated, diluted effluent having a sulfuric acid concentration of about 98% is pumped 141 to a heat exchanger 144 where it is cooled below about 90° C. after which the process stream is split into a product stream 154 and a recycle stream 114 which recycle stream is the sulfuric acid feed to the absorption tower.

EXAMPLES

Analysis for $NO_x$ is based upon the reaction of ferrous sulfate with nitrates and nitrites (including nitrosylsulfuric acid) in strong sulfuric acid to produce a red color. The intensity of the color is proportional to the amount of $NO_3$ and/or $NO_x$ present. No distinction is made between the two.

The intensity of the color is measured spectrometrically at 525 nanometers. Calculations are made relating the sample absorbance to $NO_x$ concentration. The color has a maximum intensity at approximately 80% sulfuric acid, however, the 99% acid is diluted to 93% sulfuric acid used in this method for convenience.

A standard solution of ferrous sulfate is made by mixing 20 g $FeSO_4 \cdot 7H_2O$, 75 mL DI water and 5 mL of reagent sulfuric acid (93%).

A series of sodium nitrate calibration solutions were made by combining, in a 50 mL volumetric flask, known amounts of anhydrous sodium nitrate pre-diluted in 93% sulfuric acid, 1 mL of standard ferrous sulfate solution, and the balance to 50 mL of reagent sulfuric acid (93%). The absorbance of the each solution, spanning a range of concentrations, was measured in a 23 mm cell and a calibration curve of absorbance vs. concentration (expressed as micrograms $NO_3$) was established.

The $NO_x$ level of a 99% sulfuric sample of interest was measured by adding 1 mL of standard ferrous sulfate solution to 50 mL of sample and measuring the absorbance. The $NO_x$ level in the sample is expressed as ppm $NO_3$ according to the following equation:

$$ppm\ NO_3(NO_x) = \frac{\text{micrograms } NO_3 \text{ from the calibration curve}}{\text{mL of sample} \times 1.83}$$

$$\text{mL of sample} = 50\ mL$$

$$1.83 = \text{specific gravity (g/mL)}$$

Example 1

Laboratory samples of 99% sulfuric acid with 30 to 60 ppm $NO_x$ were treated with 1.2 times the stoichiometric amount of (di)hydrazine sulfate at 40° C., 90° C. and 100° C. The reaction rate at 40° C. was found to be rather slow. However, at temperatures of 90° C. and above, the rate of $NO_x$ consumption was found to increase rapidly. It was realized that the (di)hydrazine sulfate treatment could be used as an integral part of the sulfuric acid production where the sulfuric acid was typically 100° C. or more for a long enough period, at least 1-10 minutes, that substantial reduction of $NO_x$ can occur prior to recovering the sulfuric acid product.

Example 2

Laboratory samples of 99% sulfuric acid were admixed with 1.2 times the stoichiometric amount of hydrazine sulfate at 40° C., 90° C., and 100° C. Table 1 is a graph showing the rate of niter reduction (ppm Niter/minute) in each sample as a function of temperature. As can be seen, the rate of niter reduction surprising increases exponentially as the treatment temperature is increased above 90° C. to 100° C.

What is claimed is:

1. A process for producing sulfuric acid with reduced levels of niter or nitrogen oxides ($NO_x$) comprising:
    a) providing an absorption tower wherein sulfur trioxide is absorbed in a sulfuric acid feed having a first sulfuric acid solution to produce a sulfuric acid effluent having i) a second sulfuric acid solution which has a higher concentration than the first sulfuric acid solution, ii) a $NO_x$ concentration greater than about 5 ppm by weight (as $NO_3$) and iii) an effluent temperature greater than or equal to about 90° C.; and
    b) admixing a hydrazine source selected from the group consisting of hydrazine sulfate, dihydrazine sulfate and hydrazine hydrate with the sulfuric acid effluent to form a hydrazine-treated sulfuric acid effluent, the treated sulfuric acid effluent being maintained at a temperature of greater than or equal to 90° C. for a maintenance period of at least 1 minute.

2. The process of claim 1 wherein the first sulfuric acid has a concentration of at least about 93%.

3. The process of claim 1 wherein the second sulfuric acid has a concentration of at least about 99%.

4. The process of claim 1 wherein the treated sulfuric acid effluent is maintained at a temperature of at least about 95° C.

5. The process of claim 1 wherein the treated sulfuric acid effluent is maintained at a temperature of at least about 98° C.

6. The process of claim 1 wherein the treated sulfuric acid effluent is maintained at a temperature of at least about 100° C.

7. The process of claim 1 wherein the treated sulfuric acid effluent has a $NO_x$ concentration (as $NO_3$) of about 5 ppm or less on a weight basis of sulfuric acid.

8. The process of claim 7 wherein the treated sulfuric acid effluent has a $NO_x$ concentration (as $NO_3$) of about 1 ppm or less on a weight basis of sulfuric acid.

9. The process of claim 1 wherein the hydrazine comprises hydrazine hydrate.

10. The process of claim 1 further comprising the step of diluting the sulfuric acid effluent with water wherein the dilution is performed before, after, or at the same time as the admixing of the hydrazine.

11. The process of claim 1 wherein the hydrazine is admixed with the sulfuric acid effluent at a rate of between about 0.001 and 0.1 gram of the hydrazine per liter of the sulfuric acid effluent.

12. The process of claim 1 wherein the hydrazine is admixed with the sulfuric acid effluent at a rate of between about 1 to 1.5 moles of the hydrazine per mole of $NO_x$ (as $NO_3$) in the sulfuric acid effluent.

13. The process of claim 1 wherein the hydrazine is in the form of an aqueous solution.

14. The process of claim 1 wherein the maintenance temperature of the treated effluent is maintained for a maintenance period of between about 1 minute and 30 minutes, after which maintenance period the treated effluent is cooled to a temperature below the minimum maintenance temperature.

15. The process of claim 10 further comprising the steps of: cooling the treated, diluted effluent to a temperature below about 90° C.; splitting the treated, diluted effluent into a first treated, diluted effluent stream and a second treated, diluted effluent stream; recycling the first treated, diluted effluent stream to become all or part of the sulfuric acid feed to the absorption tower; and collecting the second treated, diluted effluent stream as sulfuric acid product.

16. The process of claim 15 wherein hydrogen peroxide is added to the second diluted, treated effluent stream in an amount suitable to consume residual hydrazine.

17. The process of claim 15 wherein the sulfuric acid product has a $NO_x$ content (as $NO_3$) of less than about 5 ppm on a weight basis of sulfuric acid.

18. Sulfuric acid produced by the process of claim 1 wherein the sulfuric acid concentration is in the range of about 93% to 99% and the $NO_x$ concentration (as $NO_3$) is less than about 5 ppm on a weight basis of sulfuric acid.

19. Sulfuric acid produced by the process of claim 15 wherein the sulfuric acid concentration is in the range of about 93% to 99% and the $NO_x$ concentration (as $NO_3$) is less than about 5 ppm on a weight basis of sulfuric acid.

* * * * *